No. 642,863. Patented Feb. 6, 1900.
J. L. CREVELING.
DRIVING MECHANISM FOR DYNAMOS.
(Application filed Jan. 24, 1899.)
(No Model.)
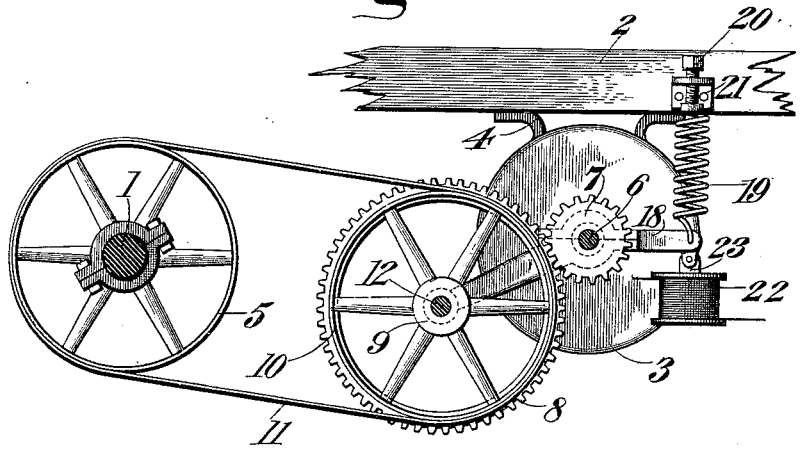
Fig. I.
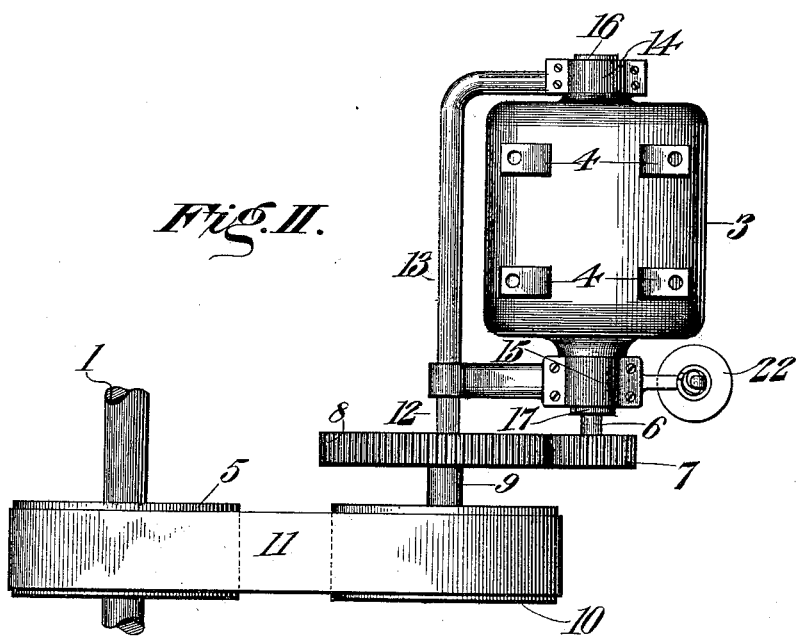
Fig. II.
Witnesses
Inventor:
John L. Creveling
By
Attorney.

UNITED STATES PATENT OFFICE.

JOHN L. CREVELING, OF NEW YORK, N. Y.

DRIVING MECHANISM FOR DYNAMOS.

SPECIFICATION forming part of Letters Patent No. 642,863, dated February 6, 1900.

Application filed January 24, 1899. Serial No. 703,245. (No model.)

*To all whom it may concern:*

Be it known that I, JOHN L. CREVELING, of New York, in the county of New York, State of New York, have invented certain new and useful Improvements in Driving Mechanism for Dynamos, of which the following is a complete specification, reference being had to the accompanying drawings.

The object of my invention is to produce improved means for driving a dynamo carried upon a car or other vehicle by power taken from the axle thereof.

In some systems of car-lighting of the class referred to the power is taken from the axle by means of a split pulley placed upon the axle and a belt running directly over the pulley and over another pulley on the shaft of the dynamo. This method necessitates the hanging of the dynamo movably, so as to allow for the movement of the axle and the pulley thereon. As a result, the oscillation of the dynamo in the stopping, starting, and jolting of the car while running over frogs and switches produces, when the movement of the dynamo is in one direction, sudden jerks and strains upon the belt, and when the movement is in the opposite direction a slackening of the tension upon the belt, which permits it to slip upon the pulley. To overcome the objections incident to the employment of a movably-suspended dynamo, the expedient has been resorted to of placing the dynamo rigidly upon the car-truck and carrying the belt over an extra pulley or idler actuated by springs to allow and compensate for the movement of the axle. By this arrangement, however, the belt is required to pass over a very small pulley on the armature-shaft at a tremendous speed and is soon worn or lashed out at the splice.

My invention is designed to overcome the difficulties experienced in the practical operation of the two species of apparatus above referred to, and I accomplish the result aimed at by the employment of a pulley operatively movable with respect to the axle as well as the dynamo and having a definite or positive operative relation with the armature shaft throughout its different movements and bearing what may be called an "accommodating" operative relation to the axle—namely, a relation which will admit of the relative movement between the axle and the part of the car-body or truck to which the pulley, as well as the dynamo, may be secured. By this device through the employment of suitable gear connection between the intermediate pulley and the armature-shaft the size of said pulley may be increased, so that a short bending of the belt may be avoided or substantially modified. Moreover, the weight of the pulley is such that its movement in a direction away from the axle does not tend to produce those injurious strains upon the belt which the weight of a movable dynamo imposes upon it, and the intermediate pulley may be so hung as practically to produce little or no movement, except designedly, in a direction toward the axle, thereby for all practicable purposes avoiding the accidental slackening of tension upon the belt.

My invention also comprehends as a means of regulating the speed of the armature-shaft means, as hereinafter specified, for slackening the tension upon the belt when the current generated by the dynamo is excessive.

In the accompanying drawings, Figure I is a side elevation of a preferred form of embodiment of my invention shown as applied to a car, a portion of the car-truck being illustrated in elevation and the car-axle being shown in section. Fig. II is a plan view of the subject-matter of Fig. I, the car-truck being omitted and a portion of the axle retained.

Referring to the figures on the drawings, 1 indicates a car-axle which is adapted in a suitable and ordinary manner to support a truck, of which 2 indicates a portion of the frame.

3 indicates a dynamo fixedly secured, as by aid of brackets 4, to the car-truck, or it may be to any part of the car-body carried upon the axle 1.

5 indicates a pulley secured to the axle 1, a split pulley being preferably employed.

6 indicates the armature-shaft, to the extremity of which is fixed a pinion 7. The pinion 7 meshes with a gear 8, that is secured to a sleeve 9, to which is also secured a pulley 10, that is operatively connected with the pulley 5, as by a belt 11. The gear 8, being secured to the sleeve 9, that is in like manner also secured to the pulley 10, constitutes, in effect, a driving member. The sleeve 9, with its gear 8 and pulley 10, is revolubly mounted upon a stud 12, projecting in a direction parallel to the axis of the shaft 6 from a rocking frame 13. The frame 13 is preferably provided with boxes 14 and 15, by which it is movably secured to hubs 16 and 17 upon the dynamo and concentric with the armature-shaft 6.

In order to compel the pulley 10 to exert a constant, though yielding, tension upon the belt 11, I prefer to employ upon the box 15 opposite the frame 13 an arm 18, to the projecting end of which is secured at one end a spring 19, that is secured at the other end to a tension-screw 20, working in a bracket 21, secured to the frame 2. Provision may be made, if necessary, for preventing too great a downward swing, as in case of breakage of the belt 11 of the frame 13, by the interposition of suitable stop mechanism. A suitable prolongation of the screw 20 will answer the purpose of stop mechanism.

Stop mechanism is not essential to the operation of the apparatus, and is therefore not illustrated.

The above-described apparatus constitutes in itself a complete embodiment of my invention; but I prefer to employ means of automatically regulating the strength of the current developed by the dynamo. For that purpose I prefer to employ a solenoid 22, whose core 23 is connected to the arm 18 opposite the spring 19. The windings of the solenoid may be either in series or multiple with the dynamo, as may be convenient, and the action of the solenoid is opposed to that of the spring 19, so that when the voltage of the dynamo shall rise above a predetermined limit or shall have risen so as to be sending a greater current than is desirable through the mains the spring 19 will yield, and thereby permitting the movement of the arm 18 and frame 13. The slackening of the belt tension, allowing the belt to slip upon the pulley, and thus diminishing the speed of rotation of the armature-shaft, effects the desired regulation.

What I claim is—

1. The combination with a car axle and frame as of its truck carried thereon, of a dynamo secured to the frame, a rocking frame upon the dynamo, a pulley geared to the armature-shaft of the dynamo, and belted to the axle, and electromagnetic means for actuating the rocking frame, substantially as set forth.

2. The combination with a car axle and frame, as of its truck, carried thereon, of a dynamo secured to the frame, a rocking frame upon the dynamo, a pulley geared to the armature-shaft of the dynamo and belted to the axle, a spring for actuating the rocking frame in order to control the tension upon the belt, and a solenoid having its core counteracting the spring, the windings of the solenoid bearing electrical relation to those of the dynamo, substantially as and for the purpose specified.

In testimony of all which I have hereunto subscribed my name.

JOHN L. CREVELING.

Witnesses:
H. G. DARWIN,
ELMER E. ALLBEE.